(12) United States Patent
Murai et al.

(10) Patent No.: US 10,232,569 B2
(45) Date of Patent: Mar. 19, 2019

(54) DEVICE AND METHOD FOR MANUFACTURING FIBER-REINFORCED PLASTIC STRUCTURE

(71) Applicant: MITSUBISHI AIRCRAFT CORPORATION, Aichi (JP)

(72) Inventors: Tomohiro Murai, Tokyo (JP); Hiroshi Tokutomi, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 894 days.

(21) Appl. No.: 14/293,283

(22) Filed: Jun. 2, 2014

(65) Prior Publication Data
US 2014/0360657 A1 Dec. 11, 2014

(30) Foreign Application Priority Data

Jun. 7, 2013 (JP) .................................. 2013-120429

(51) Int. Cl.
*B29C 70/54* (2006.01)
*B29D 99/00* (2010.01)
*B29L 31/30* (2006.01)

(52) U.S. Cl.
CPC .......... *B29C 70/543* (2013.01); *B29C 70/541* (2013.01); *B29D 99/0014* (2013.01); *B29L 2031/3076* (2013.01)

(58) Field of Classification Search
CPC ... B29C 70/543; B29C 70/541; B29C 70/682; B29C 33/12
See application file for complete search history.

(56) References Cited

U.S. PATENT DOCUMENTS 3,123,509 A * 3/1964 Toegel .................... B29C 33/00
156/191
6,478,922 B1 * 11/2002 Rosevear ................ B29C 70/44
156/285
(Continued)

FOREIGN PATENT DOCUMENTS

JP 2003-312590 A 11/2003
JP 2010-131991 A 6/2010

OTHER PUBLICATIONS

"Research in the Application of the VaRTM Technique to the Fabrication of Primary Aircraft Composite Structures", Mitsubishi Heavy Industries, Ltd., Technical Review vol. 42 No. 5 (Dec. 2005).
(Continued)

*Primary Examiner* — Matthew J Daniels
(74) *Attorney, Agent, or Firm* — Pearne & Gordon LLP

(57) ABSTRACT

A device 100 for molding a fiber-reinforced plastic structure is a device for manufacturing a fiber-reinforced plastic structure 200 integrating a stringer 2, which is a fiber-reinforced plastic member having a longer dimension in a longitudinal direction D than in a direction perpendicular to the longitudinal direction D, with a skin 1, which is a fiber-reinforced plastic member. The skin 1 is provided with a positioning plate 3, which is disposed along the skin 1 and engages with a bottom surface 201 of an end part 21 of a mandrel 20 for molding the stringer 2. The positioning plate 3 positions the stringer 2 relative to the skin 1, at least in the direction intersecting the longitudinal direction D.

14 Claims, 10 Drawing Sheets

(56) References Cited

U.S. PATENT DOCUMENTS

| | | | | |
|---|---|---|---|---|
| 6,523,246 | B1* | 2/2003 | Matsui | B29C 70/44 |
| | | | | 29/281.1 |
| 7,413,695 | B2* | 8/2008 | Thrash | B29C 70/443 |
| | | | | 264/257 |
| 2001/0035249 | A1* | 11/2001 | Kondo | B29C 70/345 |
| | | | | 156/65 |
| 2002/0027187 | A1* | 3/2002 | Sato | B29C 70/44 |
| | | | | 249/187.1 |
| 2003/0168555 | A1 | 9/2003 | Livi et al. | |
| 2010/0239865 | A1* | 9/2010 | Kallinen | B29C 70/46 |
| | | | | 428/411.1 |
| 2010/0314042 | A1* | 12/2010 | Luebbering | B29C 33/405 |
| | | | | 156/286 |
| 2010/0314807 | A1* | 12/2010 | Lengsfeld | B29C 43/3642 |
| | | | | 264/571 |
| 2013/0069281 | A1* | 3/2013 | Hurlin | B29C 33/308 |
| | | | | 264/328.1 |
| 2014/0166191 | A1* | 6/2014 | Cottrell | B29C 70/443 |
| | | | | 156/182 |

OTHER PUBLICATIONS

Office Action issued in Patent Application No. JP-2013-120429 dated Feb. 14, 2017.

* cited by examiner

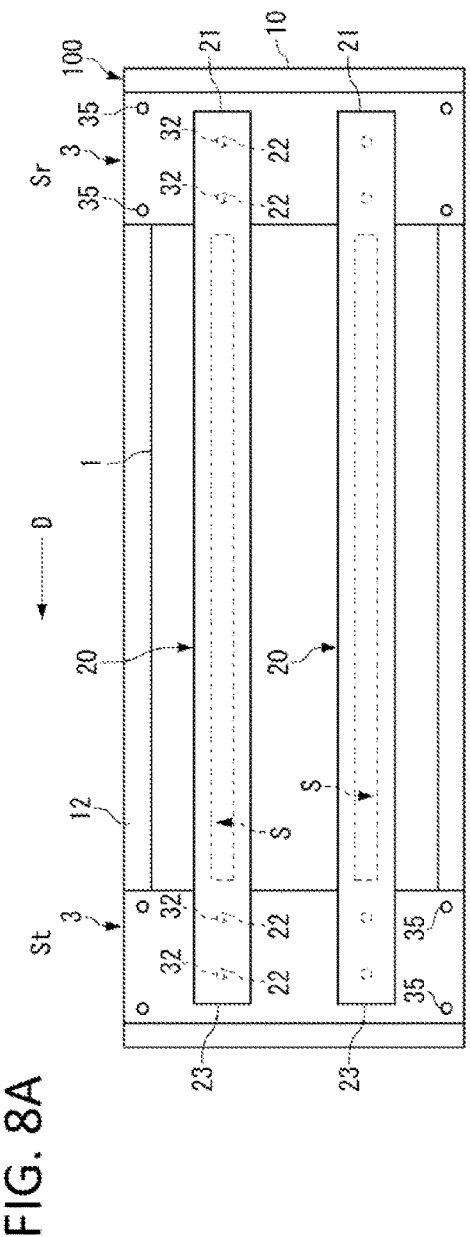
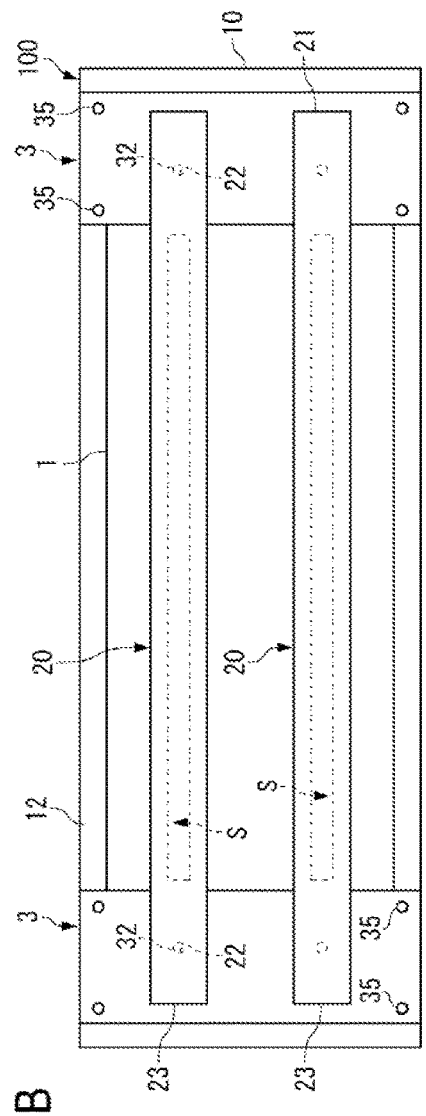
FIG. 8A
FIG. 8B

DEVICE AND METHOD FOR MANUFACTURING FIBER-REINFORCED PLASTIC STRUCTURE

BACKGROUND OF THE INVENTION

Field of the Invention

The present invention relates to a method and device for manufacturing a fiber-reinforced plastic structure.

Description of the Related Art

Being lightweight and excellent in mechanical strength, fiber-reinforced plastics (FRPs) are used for structural members of an aircraft and the like.

For example, a skin of an aircraft and multiple stringers reinforcing the skin are also formed of FRPs. The multiple stringers are provided at intervals on the back surface of the skin.

Here, as shown in Mitsubishi Heavy Industries Technical Review, Vol. 42, No. 5 (December 2005), "Research in the Application of the VaRTM Technique to the Fabrication of Primary Aircraft Composite Structures", co-bond molding is practiced in which a fiber base material as the FRP material of the stringer is disposed on a pre-molded skin, and a resin impregnating the fiber base material is heated to cure. When the resin has cured to a predetermined hardness, the stringer is molded, and at the same time the stringer is integrally bonded to the skin through an adhesive. Thus, a fiber-reinforced plastic structure is manufactured.

In the co-bond molding of the skin and the stringer, the FRP material of the stringer disposed on the skin is pressed by a mandrel which is positioned relative to the mold supporting the skin. The skin and the mandrel are then sealed between a bag film and the mold to create an enclosed space, and the stringer is molded while the enclosed space is being depressurized by evacuation of the air.

In order to position the stringers at predetermined positions on the skin, a positioning jig is engaged with upper parts of mandrels arranged on the skin. This positioning jig is extremely expensive, as it is produced laboriously by cutting a metal block with a five-axis machining tool into a shape that fits the upper parts of the mandrels disposed on the skin's curved surface.

On the other hand, as shown in FIG. 10, a positioning jig 8 which spans a mold 5 in the width direction and engages with the upper parts of mandrels 7 is also used. This positioning jig 8 includes a frame 81 supported by the mold 5 at its both ends, and blocks 82 respectively clamping the mandrels 7, and positions the mandrels 7 in the direction of arrangement of the mandrels 7.

The positioning jig 8 requires no cutting work, since it can align the blocks 82 with the upper parts of the mandrels 7 by a spring (not shown). Nevertheless, the positioning jig 8 is expensive as it includes many components such as the multiple blocks 82 and the spring provided for each block 82.

In addition, even when the mandrels are positioned by the positioning jig 8 or the positioning jig produced by cutting work, the positioning jig undergoes thermal expansion when the FRP material is heated to cure, which can degrade the positional accuracy of the stringer. Once the stringer shifts from the determined position, it is difficult to fit the stringer with its mating part.

To avoid this problem, the positioning jig can be formed from Invar, which has a low thermal expansion coefficient as with the FRP; however, the frame 81 and the block 82 of the positioning jig 8, or the positioning jig produced by cutting work have a massive form, which would require a large amount of Invar to be used and drive up the cost of the jig.

While the positioning jig can also be formed from an FRP, molding the FRP so as to fit the skin's curved surface requires complicated work, making the jig no less expensive than the jig produced by five-axis cutting work.

Moreover, with the conventional positioning jig, which presses the mandrels over a bag film, the bag film can be damaged due to rubbing between the positioning jig and the mandrels, etc. If the bag film is damaged, the resin and the fiber base material fail to be sufficiently densified, which affects the quality of the molded stringer.

Therefore, the present invention aims to provide a device and method for manufacturing a fiber-reinforced plastic structure which can position a long fiber-reinforced plastic member at a predetermined position relative to a plate-like fiber-reinforced plastic member, while reducing the cost of the positioning jig and securing the quality.

SUMMARY OF THE INVENTION

A device for manufacturing a fiber-reinforced plastic structure of the present invention is a device for manufacturing a fiber-reinforced plastic structure integrating at least one long member, which is a fiber-reinforced plastic member having a longer dimension in a longitudinal direction than in a direction intersecting the longitudinal direction, with a plate-like member, which is a fiber-reinforced plastic member, wherein a first member, which is the plate-like member or a mold supporting the plate-like member, is provided with a positioning part, which is either disposed along the first member or integrally provided in the plate-like member and which engages from the first member side with an end of a second member, which is the long member or a mold for molding the long member; and the positioning part positions the second member relative to the plate-like member, at least in the direction intersecting the longitudinal direction.

In the present invention, the positioning part which is provided in the first member engages with the end of the second member from the first member side, thereby positioning the second member relative to the plate-like member.

The positioning part is either disposed along the mold or the plate-like member, or integrally provided in the plate-like member, so that the positioning part, lying along the surface of the plate-like member, reliably positions the long member at a defined position on the plate-like member even if the plate-like member has a shape with a curved surface.

Here, when the positioning part is formed separately from the plate-like member and the mold, the positioning part may be a plate-shaped member interposed between the first member and the second member.

According to the present invention, since the positioning part is provided in the first member, it is not necessary to use a positioning jig which engages with the long member or the mold from the side opposite to the first member.

Unlike when such a positioning jig is used, according to the present invention, it is unlikely that the bag film used for depressurization is damaged by being rubbed. Thus, the FRP material can be sufficiently densified, so that the quality of the molded long member can be secured.

Moreover, since the positioning part, lying along the surface of the plate-like member, reliably positions the long member at a defined position on the plate-like member, the need for cutting work and FRP molding which have been practiced to produce the conventional positioning jig is eliminated, and the number of components can be reduced by omitting spring adjustment. Thus, the machining and molding costs and the assembly cost of the members used for positioning the members can be kept down.

In the manufacturing device of the present invention, it is preferable that the positioning part includes: a plate material formed of a material having a linear expansion coefficient approximate to the linear expansion coefficient of the fiber-reinforced plastic which forms the plate-like member and the long member; and an engaging member which is provided in the plate material and engages with the end of the second member.

Then, an elongation of the plate material of the positioning part due to thermal expansion equals an elongation of the plate-like member, so that the relative positional relation among the plate-like member, the second member engaged with the positioning part, and the positioning part remains the same while being heated during molding of the long member. Thus, the positioned state is maintained by the engaging member provided in the plate material until molding of the FRP member is completed, which makes it possible to mold the long member at a defined position on the plate-like member.

In addition, according to this configuration, only a plate-like Invar material needs to be prepared as the plate material for defining the position of the engaging member, and no massive Invar material is required. Thus, as the amount of Invar to be used is reduced, the price per volume can be kept down, and besides, general-purpose Invar plates which are more easily available can be used.

In the manufacturing device of the present invention, it is preferable that the positioning part is fixed to the plate-like member of the first member.

Then, the positioning part can achieve a high positional accuracy without being affected by thermal expansion of the mold.

In the manufacturing device of the present invention, it is preferable that the positioning part is fixed to the mold of the first member.

Then, it is not necessary to drill a hole in the plate-like member each time the long member is molded, since the hole into which the pin is inserted is formed in the mold.

In the manufacturing device of the present invention, it is preferable that the positioning part is fixed with multiple pins to the mold, and at least one of the pins is fixed at a predetermined reference position while the other pins are inserted into long holes formed in the mold along the longitudinal direction.

Then, it is possible to suppress deformation of the positioning part attributable to the difference in linear expansion coefficient between the mold and the positioning part, since a relative shift between the long holes of the mold and the pins at the time of thermal expansion of the mold is allowed. Thus, it is possible to mold the long member at a defined position on the plate-like member, while maintaining the relative positional relation among the plate-like member supported by the mold, the second member, and the positioning part.

In the manufacturing device of the present invention, it is preferable that the positioning part engages with a portion of the end of the second member on the first member side at two positions apart from each other in the longitudinal direction.

When the second member is retained by the positioning part at two positions, the long member can be positioned through the positioning part relative to the plate-like member, in both of the longitudinal direction and the direction intersecting the longitudinal direction.

In the manufacturing device of the present invention, it is preferable that the positioning part includes: a plate material; and multiple engaging members which are provided in the plate material and engage with the end of the second member, and the multiple engaging members are provided in the same plate material at positions apart from each other in the longitudinal direction.

When the multiple engaging members are provided in two or more separate plate materials, a fitting error occurs at relative positions of the multiple engaging members relative to the first member of the plate material.

Therefore, the multiple engaging members are provided in the same plate material so that a good positional accuracy can be obtained without involving fitting errors.

In the manufacturing device of the present invention, it is preferable that the mold includes a first block and a second block divided along the longitudinal direction, and a recessed part located at the boundary between the first block and the second block is formed in a portion of the end of the mold on the first member side, and the positioning part includes a protrusion which engages with the second member by being inserted into the recessed part.

This configuration is suitable for the vacuum assisted resin transfer molding (VaRTM).

The FRP material of the long member inside the mold decreases in volume by being compressed with a decrease in pressure by evacuation of the air. Thus, the FRP material, which is bulky before compression, is sandwiched between the first block and the second block, and the first block and the second block which are pressed by the differential pressure between the depressurized space and the atmosphere close the gap between them following the decreasing volume of the FRP material.

Therefore, the recessed part is formed at the boundary between the blocks so that the engaging member for positioning the members does not prevent the blocks from following the change in volume of the FRP material.

In the manufacturing device of the present invention, it is preferable that the mold has a shape with a substantially triangular transverse cross-section having a slope surface on each of the first block and the second block, and includes an angle material which is disposed on the slope surfaces of the first block and the second block.

Thus, the first block and the second block can be aligned with the center of the mold, which can contribute to improvement of the form accuracy of the long member.

In the manufacturing device of the present invention, it is preferable that the protrusion is formed in a semispherical shape or a substantially semispherical shape, and the recessed part is formed in a shape which conforms to the protrusion.

Then, it is possible to guide the blocks toward the center of the protrusion in accordance with the decreasing volume of the FRP material without the inner wall of the recessed part formed in the first block and the second block catching on the protrusion.

In addition, resin attached to the protrusion can be easily removed.

The present invention can also be developed into a manufacturing method of a fiber-reinforced plastic structure.

A method for manufacturing a fiber-reinforced plastic structure of the present invention is a method for manufacturing a fiber-reinforced plastic structure integrating a long member, which is a fiber-reinforced plastic member having a longer dimension in a longitudinal direction than in a direction intersecting the longitudinal direction, with a plate-like member, which is a fiber-reinforced plastic member, wherein a first member, which is the plate-like member or a mold supporting the plate-like member, is provided with a positioning part, which is either disposed along the first member or integrally provided in the plate-like member and which engages from the first member side with an end of a second member, which is the long member or a mold for molding the long member; and the positioning part positions the long member relative to the plate-like member, at least in the direction intersecting the longitudinal direction.

The present invention is suitable for the manufacture of a fiber-reinforced plastic structure including a skin and a stringer of an aircraft.

In this case, the plate-like member is a skin of an aircraft, and the long member is a stringer of the aircraft.

According to the present invention, it is possible to position a long fiber-reinforced plastic member at a predetermined position relative to a plate-like fiber-reinforced plastic member, while reducing the cost of the positioning jig and securing the quality.

BRIEF DESCRIPTION OF THE DRAWINGS

FIG. 8A and FIG. 8B are views showing a modified example of the present invention;

DETAILED DESCRIPTION OF THE PREFERRED EMBODIMENTS

Figure 1:
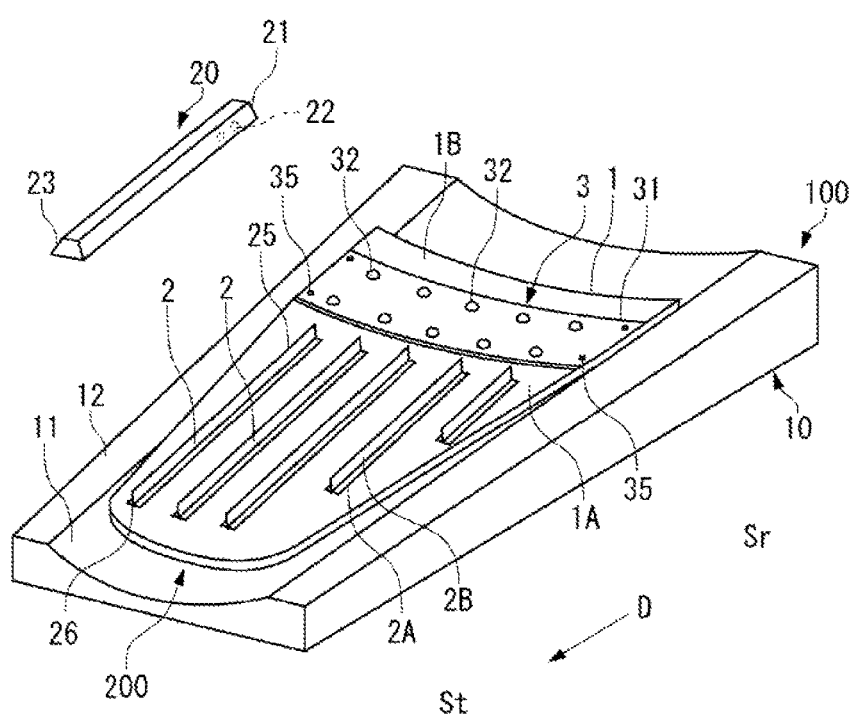
FIG. 1 is a perspective view showing a molding device according to a first embodiment.

In the following, embodiments according to the present invention will be described with reference to the accompanying drawings.

First Embodiment

In this embodiment, a fiber-reinforced plastic structure 200 integrated with a skin 1 and stringers 2 is manufactured by using a molding device 100, which includes a positioning plate 3 for positioning the stringers 2 relative to the skin 1.

First, the configuration of the fiber-reinforced plastic structure 200 will be described with reference to FIG. 1.

The fiber-reinforced plastic structure 200 includes the skin 1 and the stringers 2 provided on a back surface 1A of the skin 1.

The skin 1 forms a surface skin of a wing of an aircraft, and is assembled into a box shape with a spar (not shown). The skin 1 has a shape with a curved surface. The width of the skin 1 gradually narrows from a root side Sr toward a tip side St of the wing.

The skin 1 is molded with an extra portion 1B which is eventually cut off.

The stringer 2 is a long member extending in a longitudinal direction D, and has a longer dimension in the longitudinal direction D than in the cross-sectional direction perpendicular to the longitudinal direction D. While the stringer 2 has a T-shaped transverse cross-section, the stringer 2 may have a cross-section of another shape.

The stringer 2 includes a flange 2A to be bonded to the skin 1, and a web 2B extending upward from the center in the width direction of the flange 2A.

The multiple stringers 2 reinforce the skin 1 by being provided on the back surface 1A of the skin 1. The multiple stringers 2 are arranged at intervals in the direction intersecting the longitudinal direction D.

Both of the skin 1 and the stringer 2 are formed of a fiber-reinforced plastic (FRP) constituted of a fiber base material and a resin.

The fiber base material is formed in a sheet shape, and a required number of sheets are stacked according to the thickness of the skin 1 or the stringer 2. Any fiber including carbon fiber and glass fiber, etc. can be used as the fiber base material.

As the resin which impregnates the fiber base material, a thermosetting resin which cures by being heated, for example, epoxy, polyimide, polyurethane, unsaturated polyester, etc. can be used. In addition, a thermoplastic resin, which is solidified by being heated, such as nylon, polyethylene, polystyrene, or polyvinyl chloride, etc. can also be used.

The FRP used for the skin 1 and the FRP used for the stringer 2 may be the same or different in fiber type, resin type, constitution of the fiber base material, etc.

In this embodiment, the vacuum assisted resin transfer molding (VaRTM) is performed to mold the fiber-reinforced plastic. That is, the enclosed space is depressurized to a predetermined degree of vacuum by evacuating the air to thereby assist the resin injection, and the fiber base material and the resin are compressed by the differential pressure between the depressurized space and the atmosphere.

Next, the molding device 100 which constitutes the device for manufacturing the fiber-reinforced plastic structure 200 will be described.

As shown in FIG. 1, the molding device 100 includes a mold 10 for molding the skin 1, and a mandrel 20 serving as a mold for molding the stringer 2. In this embodiment, so-called co-bond molding is performed in which the stringer 2 is molded on and bonded to the molded skin 1 at the same time.

FIG. 1 shows a state where the mandrel 20 is removed after the stringer 2 is molded.

The mold 10 is formed of a given metal material such as steel, etc. The mold 10 includes a molding part 11 having a curved surface for molding the skin 1, and a peripheral part 12 which is a portion surrounding the molding part 11.

The mandrel 20 presses the material (raw material) of the fiber-reinforced plastic for molding the stringer 2 against the back surface 1A of the skin 1. The mandrel 20 which has dimensions and a shape corresponding to each stringer 2 is prepared.

It is preferable that the mandrel 20 is formed of Invar which is an iron-nickel alloy. Invar has a linear expansion coefficient approximate to the linear expansion coefficient of the FRP, which forms the skin 1 and the stringer 2, in a wide temperature range including temperatures near the ambient temperature, and the temperature at which the resin is heated lies in a temperature range where the linear expansion coefficient of Invar is low. The mandrel 20 can also be formed of another material which has a linear expansion coefficient approximate to that of the FRP.

Here, a linear expansion coefficient within a range of up to about $\pm 3\times 10^{-6}$ of the linear expansion coefficient of the FRP which forms the skin 1 and the stringer 2 can be considered as approximate. Depending on the fiber type and the stacked constitution, the linear expansion coefficient of the FRP ranges from about $-1\times 10^{-6}$ up to about $4.4\times 10^{-6}$. The linear expansion coefficient of the FRP in this embodiment is, for example, $1.6\times 10^{-6}$.

Even when the linear expansion coefficient is different between the FRP used for the skin 1 and the FRP used for the stringer 2, the linear expansion coefficient of the both FRPs shall be assumed to be within the above-described range of approximation.

Figure 2A:
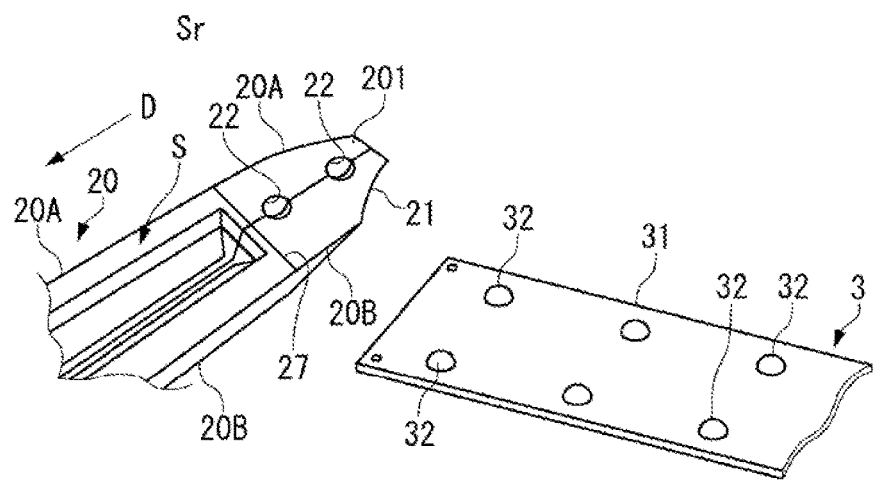
FIG. 2A and FIG. 2B are perspective views showing a mandrel of a stringer and a positioning plate.
Figure 2B:
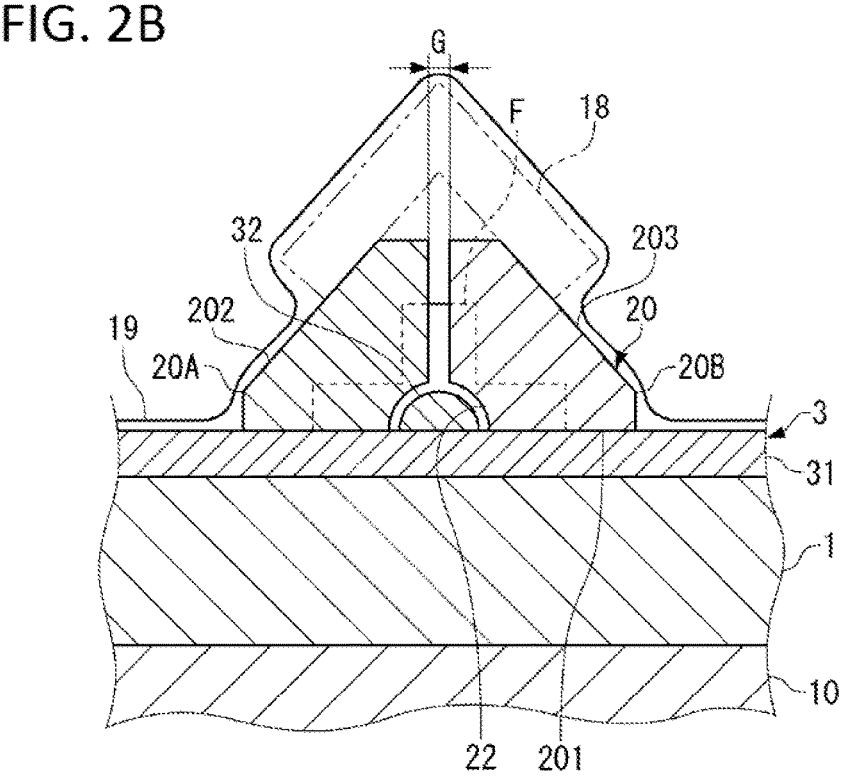

As shown in FIG. 2B, the mandrel 20 has a shape with a substantially triangular transverse cross-section corresponding to the shape of the stringer 2, which is molded into an inverted T-shape on the skin 1, and includes a bottom surface 201 and two slope surfaces 202 and 203.

The mandrel 20 is divided along the longitudinal direction D into a block 20A located on one side of the web 2B (FIG. 1) of the stringer 2 and a block 20B located on the other side, and a molding space S for molding the FRP is created between these blocks 20A and 20B.

During molding of the stringer 2, a fiber base material F together with the resin is compressed inside the blocks 20A and 20B by evacuation of the air. The volume of the fiber base material F is reduced by compression. Thus, the fiber base material F, which is bulky before compression, is sandwiched between the block 20A and the block 20B, and when the air is evacuated, the block 20A and block 20B, being pressed by the differential pressure with respect to the atmospheric pressure, close the gap between them following the decreasing volume of the fiber base material, thereby creating the molding space S. A liquid resin is injected from the outside into the molding space S through an injection passage (not shown).

Here, it is preferable that an angle material 18 indicated by the two-dot chain line in FIG. 2B is disposed on the slope surfaces 202 and 203 of the blocks 20A and 20B, to thereby align the blocks 20A and 20B with the center of the mandrel 20. To correctly restrict the motion of alignment, it is more preferable that the angle material 18 and the block 20A and the block 20B are engaged at both ends in the length direction. To engage the blocks 20A and 20B, for example, a protrusion may be formed on the inner surface of the angle material 18 while a recessed part for receiving the protrusion may be formed in the block 20A and the block 20B.

The molding space S is closed by an end part 21 serving as one end in the longitudinal direction D of the mandrel 20, and an end part 23 (FIG. 1) serving as the other end.

Two recessed parts 22 and 22 apart from each other in the longitudinal direction D are formed in the bottom surface 201 of the end part 21 located on the wing root side Sr. These recessed parts 22 and 22 are formed in each of the multiple mandrels 20.

The two recessed parts 22 of the mandrel 20 are each formed in a semispherical shape at the boundary between the block 20A and the block 20B. The center of the recessed part 22 is located at the boundary between the block 20A and the block 20B. The recessed part 22 is formed of a quarter-spherical dent formed in the block 20A, a quarter-spherical dent formed in the block 20B, and a straight part 22A (FIG. 3A) formed on the rim of the opening.

Next, the configuration of the positioning plate 3 will be described, which is included in the molding device 100 for positioning the stringer 2 at a predetermined position on the back surface 1A of the skin 1.

As shown in FIG. 1, the positioning plate 3 includes a rectangular plate material 31 and multiple protrusions 32 provided on the plate material 31.

The plate material 31 is a thin plate with a thickness of, for example, about 1 mm to 5 mm. The plate material 31 spans both ends of the mold 10 in the width direction at a position where the end part 21 of the mandrel 20 is located. The plate material 31 is fixed with pins 35 in the extra portion 1B of the molded skin 1 on both one end side and the other end side in the width direction.

As with the mandrel 20, the plate material 31 is preferably formed from a material, such as Invar, etc. having a linear expansion coefficient approximate to that of the FRP. It is also possible to form the mandrel 20 from an FRP. The range of approximation is as described above.

The wing root side Sr requires a higher positional accuracy than the wing tip side St for fitting the stringer 2 to its mating part (e.g., auxiliary spar). If the stringer is positioned by the positioning plate 3 on the root side Sr, the positional accuracy required for the root side Sr of the skin 1 can be secured, and a positional error on the tip side St of the skin 1 can be confined to an allowable range.

Therefore, an example of positioning the stringer on the root side Sr will be shown in this embodiment.

The pins 35 provided at both ends of the positioning plate 3 position the positioning plate 3 relative to the skin 1 and fix the positioning plate 3. It is necessary to provide the pins 35 at two positions apart from each other such as at the both ends of the positioning plate 3. For example, a total of two pins 35 may be provided, one each at one end side and the other end side of the positioning plate 3.

However, the positioning plate 3 may be fixed to the skin 1 by other means than using the pins 35. As long as the positioning plate 3 can be removed from the skin 1 after the stringer 2 is molded, any means can be used to fix the positioning plate 3 to the skin 1.

The plate material 31 is formed in a flat shape, and due to its thinness, the plate material is flexible enough to deform in the out-of-plane direction. When the plate material 31 is disposed on the skin 1, the plate material 31 deforms along the skin 1. The end part 21 of the mandrel 20 is disposed on the positioning plate 3. The positioning plate 3 maintains its shape along the skin 1 due to its own weight or by being pressed by the end part 21 in addition to the own weight.

A step 27 (FIG. 2A), which is set back from the back surface 1A of the skin 1 by the thickness of the positioning plate 3, is formed on the bottom surface 201 of the end part 21.

The two protrusions 32 and 32 located on an extended line of the molding space S of the mandrel 20 when the plate material 31 is disposed along the skin 1 are provided on the plate material 31 by means such as welding, pressure welding, bonding, connection through bolts or pins, or by cutting integrally with the plate material 31, etc.

Figure 3A:
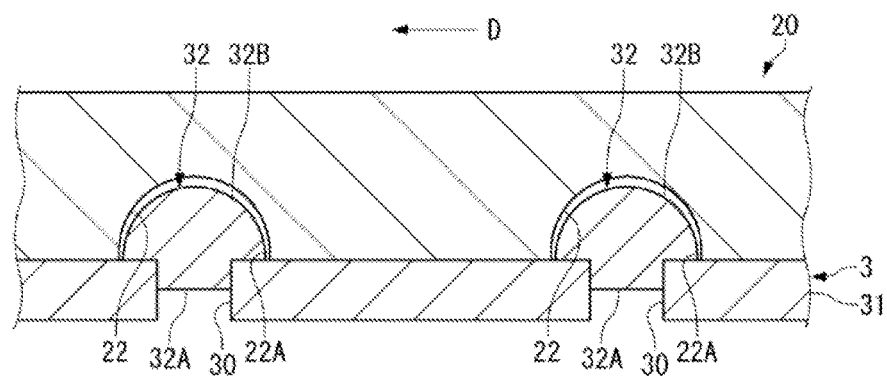
FIG. 3A and FIG. 3B are views showing protrusions of the positioning plate to be inserted into holes of the mandrel.

As shown in FIG. 3A, each protrusion 32 integrally includes a holding part 32A to be held by the plate material 31 and a semispherical protrusion body 32B provided at one end of the holding part 32A. A spherical head pin with the tip of its head formed in a semispherical shape may also be used as the protrusion 32.

When the holding parts 32A are inserted into through-holes 30, which are formed apart from each other in the longitudinal direction D, so as to pass through the positioning plate 3 in the thickness direction, the protrusion body 32B protrudes from the positioning plate 3.

The protrusions 32 and 32 of the positioning plate 3 correspond to the recessed parts 22 and 22 formed in the end part 21 of the mandrel 20, and the protrusion body 32B of each protrusion 32 is inserted into the recessed part 22. Since the recessed part 22 includes the straight part 22A, the recessed part 22 is formed to a depth larger than the height of the protrusion body 32B. This prevents the tip of the protrusion body 32B from hitting the bottom of the recessed part 22.

When the protrusion body 32B of each protrusion 32 is inserted into the recessed part 22, the mandrel 20 is retained on the positioning plate 3 at two positions where the protrusions 32 and 32 are located. Then, since the positioning plate 3 is fixed to the skin 1, the mandrel 20 is positioned relative to the skin 1 in both the longitudinal direction D and the direction perpendicular to the longitudinal direction D.

Accordingly, the stringer 2 molded by the mandrel 20 is also positioned relative to the skin 1 in both the longitudinal direction D and the direction perpendicular to the longitudinal direction D.

The distance between the protrusions 32 and 32 is set appropriately according to the required positional accuracy.

The number of the protrusions 32 is not limited to two, but may be three or more.

While it is also possible to form the recessed part 22 in the positioning plate 3 and form the protrusion 32 on the mandrel 20, as will be described later, the protrusion 32 is formed on the positioning plate 3 and the recessed part 22 is formed in the mandrel 20 in order to guide the blocks 20A and 20B by the protrusion 32 and close the gap between them.

Figure 3B:
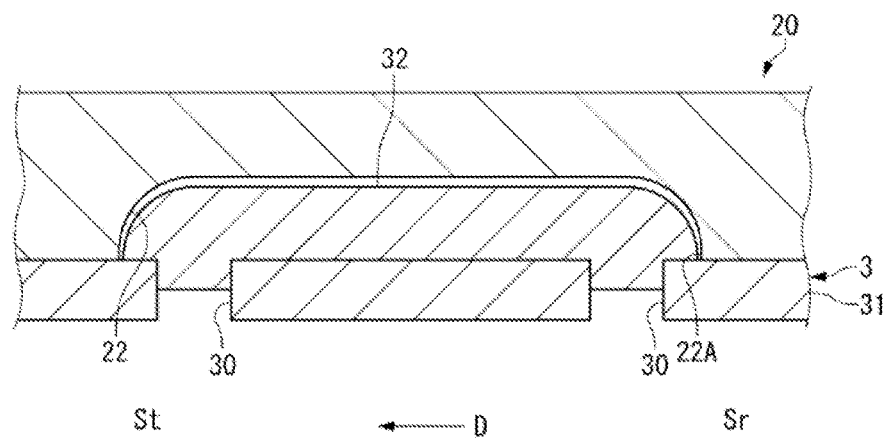

Here, as shown in FIG. 3B, instead of forming the protrusions 32 and the recessed parts 22 at two positions apart from each other in the longitudinal direction D, the protrusion 32 and the recessed part 22 may be formed in an elongated shape along the longitudinal direction D. Since the protrusion 32 and the recessed part 22 have a smaller dimension in the width direction perpendicular to the longitudinal direction D than in the longitudinal direction D, rotation of the protrusion 32 inside the recessed part 22 can be restricted. Also in this way, the mandrel 20 can be retained on the positioning plate 3.

The positions of the through-holes 30 and 30 which define the positions of the protrusions 32 and 32 are important in securing the positional accuracy of the positioning plate 3, while thermal expansion of the protrusions 32 and 32 does not significantly affect the positional accuracy. Therefore, the protrusions 32 and 32 do not need to be formed from a material with a small linear expansion coefficient, and may be formed from any metal material including steel and aluminum, etc. The protrusions may be formed of FRPs, resin, or ceramics other than metal materials.

On the other hand, it is also possible to prepare two positioning plates each of which has only one protrusion 32 corresponding to the mandrel 20, and fix each of the positioning plates with the pins 35 to the skin 1. However, this results in a positional error (fitting error) of the positioning plate relative to the skin 1 at the relative positions of the protrusion 32 of one of the positioning plates and the protrusion 32 of the other positioning plate.

From the viewpoint of the positioning accuracy, it is therefore preferable that the protrusions 32 and 32 corresponding to the mandrels 20 are provided on the same positioning plate 3.

Figure 4:
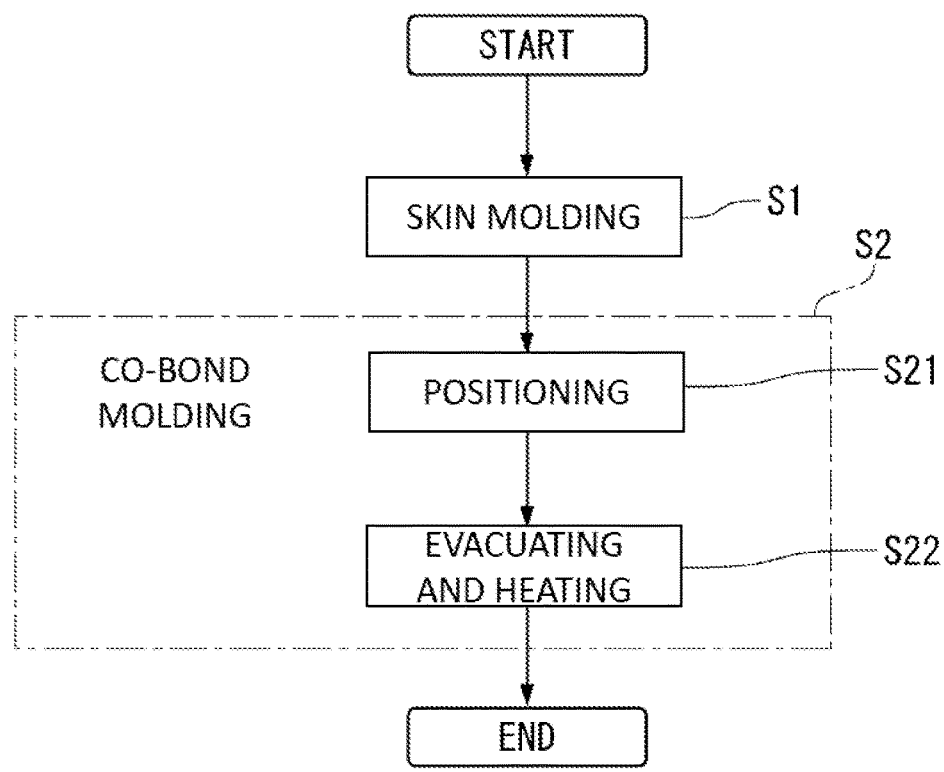
FIG. 4 is a chart showing a procedure for manufacturing a fiber-reinforced plastic structure.

Next, a method for manufacturing the fiber-reinforced plastic structure 200 will be described with reference to FIG. 4 and FIG. 5.

First, the skin 1 is molded (skin molding step S1). Any method can be used to mold the skin 1; here, a procedure for molding the skin by the VaRTM method will be briefly described.

The fiber base material F as the FRP material of the skin 1 is disposed on the mold 10 and pressed by a plate-like molding jig (not shown). The fiber base material F and the molding jig are sealed between a bag film (not shown) and the mold 10 to create an enclosed space, and the enclosed space is depressurized by evacuating the air. Thus, the resin injection is assisted and the fiber base material F and the resin are compressed.

Concurrently with evacuation of the air, the resin is heated using a given heat source. An oven, heater mat, heat gun, etc. can be used as the heat source.

Once the resin has cured to a predetermined hardness and the fiber base material F and the resin are integrated, the skin 1 is molded.

The molded skin 1 is demolded to be examined, for example, with ultrasound.

Thereafter, the skin 1 is placed back on the mold 10, and the stringer 2 is molded on the back surface 1A of the skin 1 (co-bond molding step S2).

Figure 5:
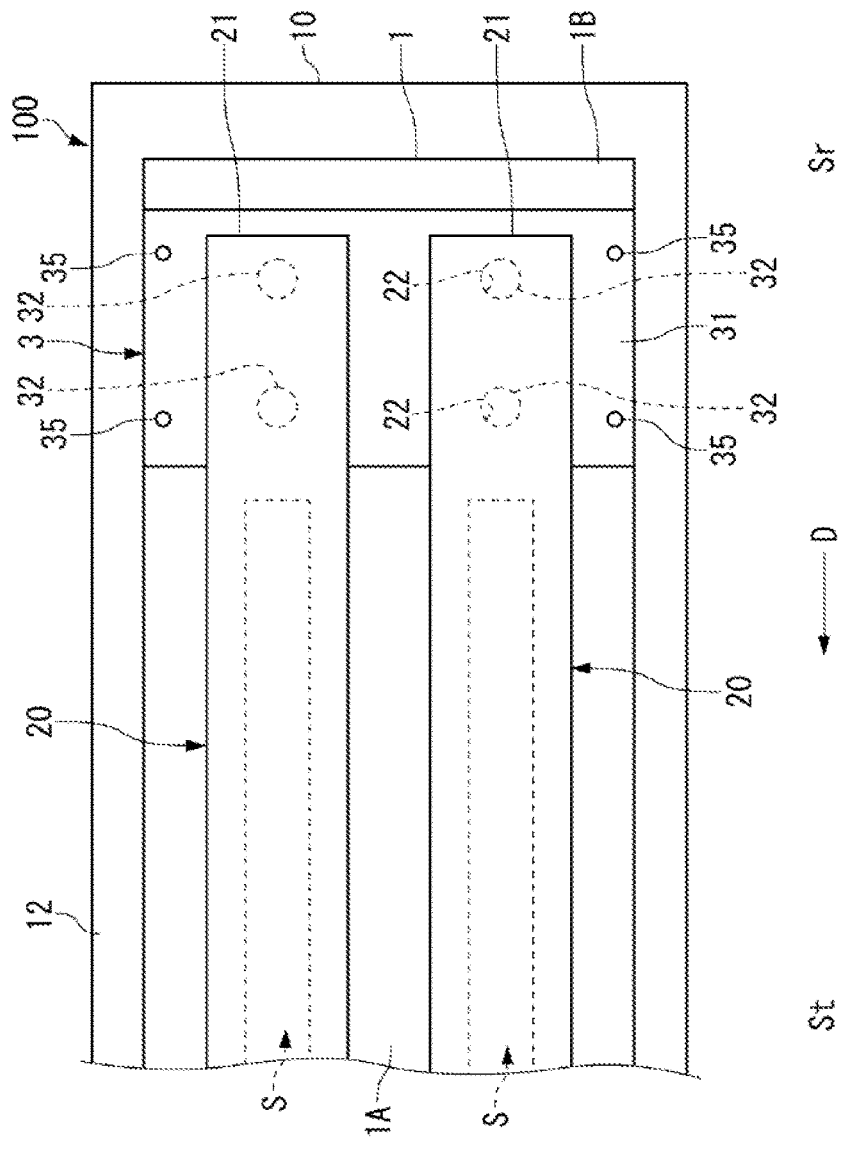
FIG. 5 is a schematic plan view illustrating positioning of the stringer relative to a skin.

As shown in FIG. 5, in the co-bond molding step S2, the mandrel 20 is positioned relative to the skin 1 by using the positioning plate 3 (positioning step S21).

In the positioning step S21, the positioning plate 3 is disposed on the skin 1 supported by the mold 10, and the positioning plate 3 is fixed with the pins 35 at both ends. The plate material 31 of the positioning plate 3 is disposed along the curved surface of the skin 1.

Then, the multiple mandrels 20 are arranged on the back surface 1A of the skin 1. At this time, the protrusions 32 and 32 of the positioning plate 3 are inserted into the recessed parts 22 and 22 of the end part 21 of the mandrel 20. Here, as both the protrusions 32 and 32 and the recessed parts 22 and 22 have a semispherical shape or a substantially semispherical shape, the protrusions 32 and 32 of the positioning plate 3 are smoothly inserted into the recessed parts 22 and 22.

Now that the protrusions 32 and 32 of the positioning plate 3 are inserted into the recessed parts 22 and 22 of the mandrel 20, the mandrel 20 is positioned relative to the skin 1 through the positioning plate 3.

Thereafter, the stringer 2 is molded by evacuating the air and heating in the same manner as molding of the skin 1 (evacuating and heating step S22).

In this step S22, the fiber base material F is disposed at a predetermined position on the back surface 1A of the skin 1, and the fiber base material F is sandwiched between the blocks 20A and 20B of the mandrel 20. At this time, a gap G (FIG. 2B) is left between the blocks 20A and 20B. An adhesive formed in a film shape is interposed between the fiber base material F and the skin 1.

Next, the skin 1 and the multiple mandrels 20 are covered with a bag film 19 (FIG. 2B), and an enclosed space created between the bag film 19 and the mold 10 is depressurized by evacuation of the air.

Then, the differential pressure between the enclosed space and the atmosphere acts on the blocks 20A and 20B, and on the fiber base material F and the resin inside the blocks, causing the blocks 20A and 20B to close the gap between them following the compression of the fiber base material F and the resin impregnating the fiber base material.

At this time, since the protrusion 32 has a semispherical shape and the recessed part 22 has also a semispherical shape which conforms to the protrusion 32, the blocks 20A and 20B can be prevented from catching on the protrusions 32 and 32. In addition, the inner wall of the recessed part 22 is guided by the surface of the semispherical protrusion 32. When the blocks 20A and 20B has closed the gap, the protrusion 32 is located inside the circular opening of the recessed part 22. At this time, the original gap G disappears.

The resin impregnating the fiber base material F is heated in the evacuating and heating step S22. The heat generated from the heat source heating the resin is transmitted to the mandrel 20 as well as the positioning plate 3.

Here, since the mandrel 20 and the plate material 31 of the positioning plate 3 are formed of Invar having a linear expansion coefficient approximate to the linear expansion coefficient of the FRP as described above, their elongation is equal to that of the skin 1.

Thus, the relative positional relation among the skin 1, the mandrel 20, and the positioning plate 3 remains the same while these members are heated, so that the positioned state of the mandrel 20 relative to the skin 1 is maintained.

Once the resin impregnating the fiber base material F has cured by heat to a predetermined hardness, the stringer 2 is molded, and at the same time, is integrally bonded to the skin 1.

Thereafter, secondary cure treatment and finish treatment are performed as necessary to complete the fiber-reinforced plastic structure 200 integrated with the skin 1 and the stringer 2.

In the embodiment described above, the positioning plate 3, which is interposed between the mandrel 20 and the skin 1 and is fixed to the skin 1, positions the mandrel 20 for molding the stringer 2 relative to the skin 1 from the bottom surface 201 side.

Since the plate material 31 of the positioning plate 3 is formed in a thin plate shape so as to be interposed between the mandrel 20 and the skin 1, the plate material 31 deforms along the skin 1 and maintains its shape that fits the curved surface of the skin 1 due to its own weight or by being pressed by the end part 21. Since the positioning plate 3 positions by the protrusions 32 and 32 in a state where the plate material 31 fits the curved surface of the skin 1, the stringer 2 can be positioned at a predetermined position on the skin 1 having the curved surface.

The plate material 31, which is formed of Invar having a linear expansion coefficient approximate to that of the FRP, allows the protrusions 32 and 32 provided on the plate material 31 to maintain the positioned state of the mandrel 20 until the molding of the stringer 2 is completed after heating. Thus, the stringer 2 can be molded at a defined position on the skin 1.

In this embodiment, since the positioning plate 3 is fixed to the skin 1 but is not fixed to the mold 10, the positioning plate 3 can achieve a high positional accuracy without being affected by thermal expansion of the mold 10.

In addition, even when the skin 1 shifts to some extent from a predetermined position on the mold 10 when the skin 1 is placed back on the mold 10, this does not affect the positional accuracy of the stringer 2 in the skin 1.

In this embodiment, since the positioning plate 3 which engages with the bottom surface 201 of the end part 21 of the mandrel 20 is used as described above, it is not necessary to use the positioning jig which engages with the upper part of the mandrel 20.

The advantages afforded by this will be described as follows.

First, in this embodiment, it is unlikely that the bag film 19 is damaged by being rubbed between the positioning jig and the mandrel 20, since the positioning plate 3 positions the mandrel 20 from the bottom surface 201 side. Thus, depressurization can be reliably performed by evacuating the air and the resin and the fiber base material can be sufficiently compressed and densified, so that the quality of the molded stringer 2 can be secured.

Secondly, the production cost of the members used for positioning the members can be kept down as described below.

Figure 10:
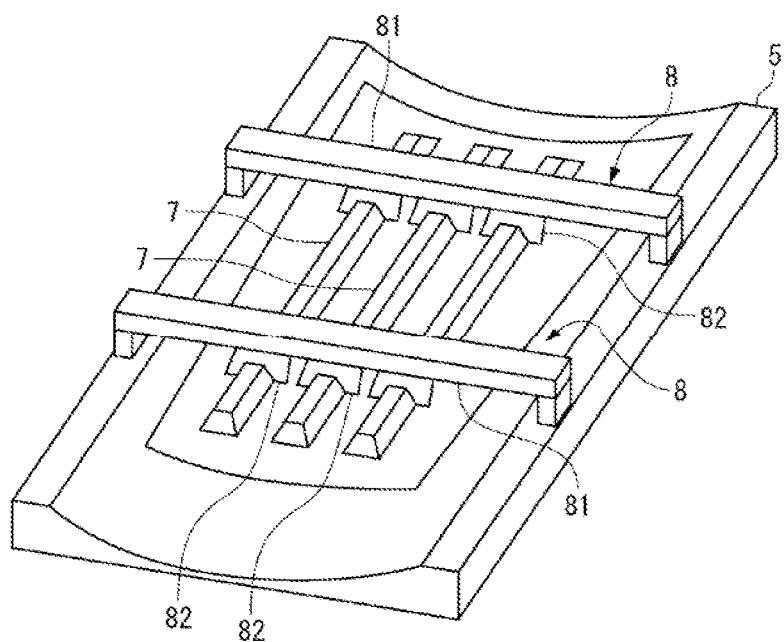
FIG. 10 is a view showing a conventional positioning jig.

When the positioning jig which engages with the upper part of the mandrel 20 is used, it is necessary to cut a metal block or perform FRP molding to form the positioning jig into a shape that fits the upper parts of the mandrels 20, or it is necessary, as with the positioning jig 8 shown in FIG. 10, to constitute the jig with many components so that the position of the block 82 clamping the upper part of the mandrel 20 can be adjusted with a spring.

In this embodiment, by contrast, the protrusion 32 provided on the plate material 31 is reliably inserted into the recessed part 22 of the mandrel 20, as the plate material 31 of the positioning plate 3 fits the skin 1.

Then, the need for expensive five-axis cutting work and FRP molding is eliminated, and the number of components can be reduced by omitting spring adjustment. Thus, the machining and molding costs and the assembly cost of the members used for positioning the members can be kept down.

From the viewpoint of the material cost of the positioning jig, in this embodiment, only a planar Invar material needs to be prepared as the plate material 31 of the positioning plate 3, and a massive Invar material is not required. Thus, as the amount of Invar to be used is reduced, the price per volume can be kept down, and besides, general-purpose Invar plates which are more easily available can be used.

In addition to the above advantages, according to this embodiment, the recessed part 22 is formed at the boundary between the blocks 20A and 20B on the bottom surface 201 of the mandrel 20 so that the protrusion 32 and the recessed part 22 for positioning the members do not prevent the blocks 20A and 20B from following the change in volume of the fiber base material. Since the blocks 20A and 20B are positioned by the same recessed part 22, the positions of the blocks 20A and 20B relative to each other are unlikely to shift.

In addition, since the recessed part 22 and the protrusion 32 are formed in a semispherical shape, the blocks 20A and 20B can be guided toward the center of the protrusion 32 without the inner wall of the recessed part 22 catching on the protrusions 32 and 32. In addition, resin attached to the protrusion 32 can be easily removed.

The shape of the protrusion body 32B of the protrusion 32 and the recessed part 22 is not limited to a semispherical shape or a substantially semispherical shape. For example, the protrusion 32 can be formed in a columnar shape or a rectangular columnar shape protruding in the out-of-plane direction from the plate material 31 of the positioning plate 3; however, a shape with a chamfered curved surface is preferable in order to avoid catching on of the blocks and facilitate removal of attached resin.

Since a semispherical shape or a substantially semispherical shape adopted in this embodiment is three-dimensionally symmetrical with respect to the center, it is possible to minimize the chance of catching on of the blocks 20A and 20B and guide the blocks toward the center of the protrusion. Thus, a semispherical shape or a substantially semispherical shape is the most appropriate shape for the protrusion body 32B and the recessed part 22.

Alternatively, the protrusion body 32B and the recessed part 22 can be formed in a shape of one half of an oval sphere divided into halves.

Also, the protrusion body 32B and the recessed part 22 may have a shape of one half of a column divided into two parts along the longitudinal direction (semicircular column). In this case, as shown in FIG. 3B, the both ends in the longitudinal direction D are preferably rounded to a curved surface.

Modified Example of First Embodiment

In the above-described embodiment, the positioning plate 3 is fixed to the skin 1. Since the positioning plate 3 is formed of a material having a linear expansion coefficient approximate to the linear expansion coefficient of the FRP, the stringer 2 is positioned relative to the skin 1 through the positioning plate 3 as described above.

Here, instead of fixing the positioning plate 3 to the skin 1, a part serving as the positioning plate 3 may be integrally provided in the skin 1. That is, holes for holding the protrusions 32 and 32 may be formed in a region of the skin 1 opposite to the bottom surface 201 of the end part 21 of the mandrel 20. This region is preferably the extra portion 1B.

Thus, if the positioning part equivalent to the positioning plate 3 is integrally included in the skin 1, the mandrel 20 is directly positioned relative to the skin 1, so that the stringer 2 can be positioned with higher accuracy relative to the skin 1 without involving a positional error of the positioning plate 3 relative to the skin 1.

Second Embodiment

Next, a second embodiment of the present invention will be described with reference to FIG. 6 and FIG. 7.

The following description will be focused on differences from the first embodiment. The same components as those of the first embodiment are denoted by the same reference signs.

The second embodiment differs from the first embodiment in that, instead of fixing the positioning plate 3 to the skin 1, the positioning plate 3 is fixed to the mold 10 which supports the skin 1 at a predetermined position.

Figure 6:
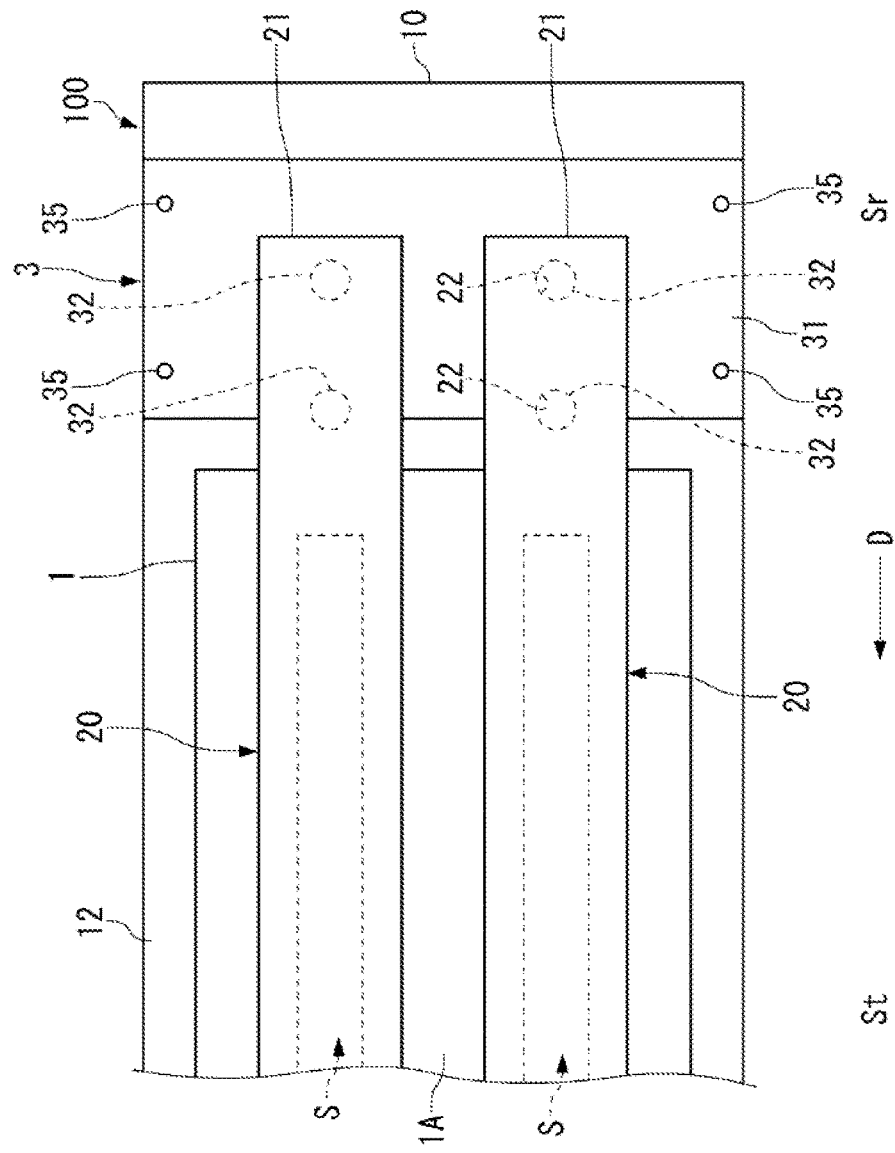
FIG. 6 is a schematic plan view showing a molding device according to a second embodiment and illustrating positioning of the stringer relative to the skin.

As shown in FIG. 6, the positioning plate 3 is fixed with the pins 35 on the peripheral part 12 of the mold 10. The positioning plate 3 is interposed between the mold 10 and the end part 21 of the mandrel 20.

When manufacturing the fiber-reinforced plastic structure 200, the positioning plate 3 is disposed on the mold 10 and fixed with the pins 35 in the positioning step S21.

At this time, the plate material 31 of the positioning plate 3 deforms so as to conform to the molding part 11 of the mold 10 corresponding to the curved surface of the skin 1, and maintains the shape that fits the curved surface of the skin 1 due to its own weight or by being pressed by the end part 21. Thus, the stringer 2 can be positioned through the positioning plate 3 at a predetermined position on the skin 1 having the curved surface.

Here, the mold 10 undergoes thermal expansion due to heating while the stringer 2 is molded.

It is therefore preferable that the pin 35 for fixing the positioning plate 3 is inserted into a long hole of the mold 10 so as to provide a degree of freedom at relative positions of the pin 35 and the hole.

As long as the pins 35 are provided at two positions apart from each other, any number of the pins 35 may be provided at any position. In this embodiment, the positioning plate 3 is retained on the mold 10 with the pins 35 at two positions at both ends.

Figure 7:
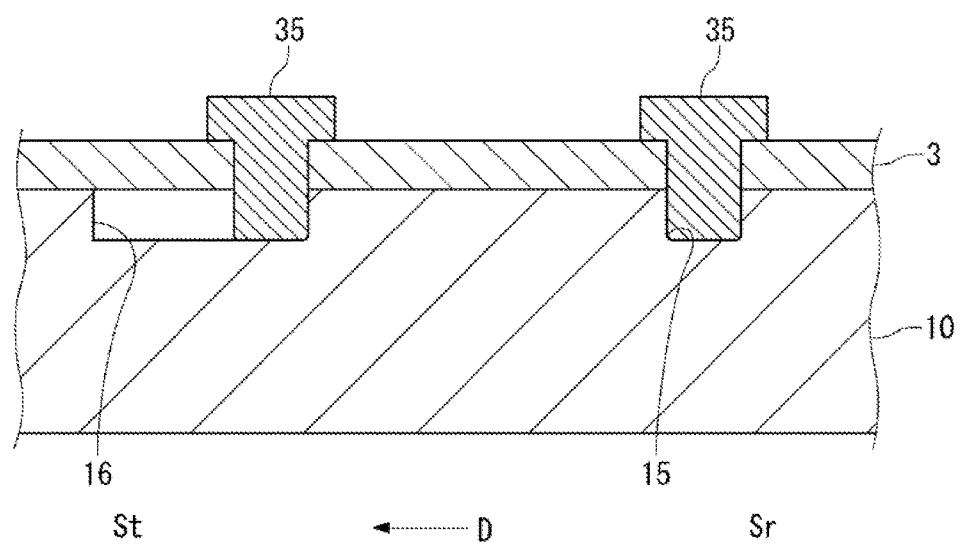
FIG. 7 is a view showing holes of a mold into which pins for fixing the positioning plate to the mold are inserted.

As shown in FIG. 7, the pins 35 and 35 provided at one end and the other end of the positioning plate 3 are apart from each other in the longitudinal direction D. Of these pins 35 and 35, one pin 35 located on the root side Sr is inserted into a hole 15 having a circular opening cross-section which is formed at a reference position. The other pin 35 is inserted into a long hole 16 which is formed along the longitudinal direction D. The long hole 16 has a larger dimension in the longitudinal direction D than the diameter of the pin 35.

Then, the pin 35 relatively shifts along the long hole 16 when the mold 10 undergoes thermal expansion, so that deformation of the positioning plate 3 attributable to the difference in linear expansion coefficient between the mold 10 and the positioning plate 3 can be suppressed. Therefore, the relative positional relation among the skin 1 supported by the mold 10, the mandrel 20, and the positioning plate 3 can be maintained and the stringer 2 can be molded at a defined position on the skin 1.

According to this embodiment, since the hole into which the pin 35 for fixing the positioning plate 3 to the mold 10 is formed in the mold 10, it is not necessary to drill a hole in the skin 1 each time co-bond molding of the stringer 2 is performed.

Modified Example of the Present Invention

As shown in FIG. 8A, the positioning plate 3 may be disposed on both the root side Sr and the tip side St of the wing.

That is, the positioning plate 3 is disposed at a position corresponding to the end part 21 of the mandrel 20 located on the root side Sr, and the positioning plate 3 is also disposed at a position corresponding to the end part 21 located on the tip side St.

Here, as with the second embodiment, an example of fixing the positioning plate 3 to the mold 10 will be shown; however, the positioning plate 3 can also be fixed to the skin 1 as with the first embodiment.

The positioning plates 3 and 3 disposed on both end sides of the stringer 2 determine the positions of one end 25 (FIG. 1) of the stringer 2 on the root side Sr as well as of the other end 26 (FIG. 1) on the tip side St relative to the skin 1. If the position of the stringer 2 is determined only on the root side Sr, positional errors accumulate toward the tip side St when the stringer 2 slightly rotates from the root side Sr. In contrast, when the position of the stringer 2 relative to the skin 1 is determined on both end sides, even when the distance from the one end 25 to the other end 26 is long, a good positional accuracy can be achieved over the entire length.

The configuration of determining the position of the stringer 2 on both ends is suitable for the skin 1 and the stringer 2 used for a main wing which is longer than a tail fin.

Of course, the positioning plate 3 can be used not only for the wing but also for the skin 1 and the stringer 2 used for a fuselage.

Whether to provide the positioning plate 3 on the one end side or the other end side of the stringer 2 is determined on the basis of factors such as presence of a mating part, and the impact of the positional accuracy on the strength on the one end side and the other end side.

As shown in FIG. 8B, the present invention also encompasses a configuration where the positioning plate 3 having only one protrusion 32 corresponding to the mandrel 20 is disposed on both the root side Sr and the tip side St. The mandrel 20 is positioned relative to the skin 1 by the protrusion 32 of the one positioning plate 3 and the protrusion 32 of the other positioning plate 3 located apart from the first protrusion 32.

It is also possible, as long as within the scope of the present invention, to select some of the configurations described in the above embodiments, or to arbitrarily change some of the configurations into another configuration.

Figure 9A:
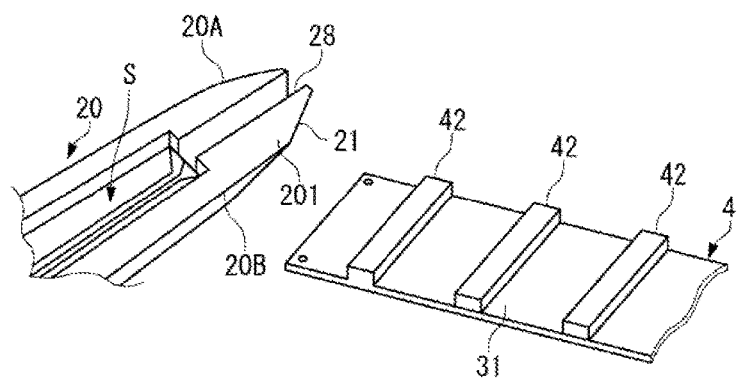
FIG. 9A and FIG. 9B are views showing another modified example of the present invention.

The present invention also encompasses a configuration where a positioning plate 4 shown in FIG. 9A positions the stringer only in the direction intersecting the longitudinal direction D.

The positioning plate 4 is formed with multiple ridges 42 extending along the longitudinal direction D. The multiple ridges 42 are arranged at intervals in the direction intersecting the longitudinal direction D. Each ridge 42 is provided on the plate material 31 by means such as welding, pressure welding, bonding, connection through bolts or pins, or by cutting integrally with the plate material 31, etc. Any means can be used to provide the ridge 42 on the plate material 31; for example, multiple spherical head pins may be provided on the plate material 31, and blocks may be put on the heads of the spherical head pins to provide the ridge 42.

On the other hand, a groove 28 is formed in the bottom surface 201 of the mandrel 20 along the longitudinal direction D. The groove 28 is located at the boundary between the blocks 20A and 20B.

When the positioning plate 4 is fixed to the skin 1 or the mold 10 and the mandrel 20 is placed on the positioning plate 4, the ridge 42 is inserted into the groove 28. The mandrel 20 is thereby positioned relative to the skin 1 in the direction of arrangement of the stringers 2.

Figure 9B:
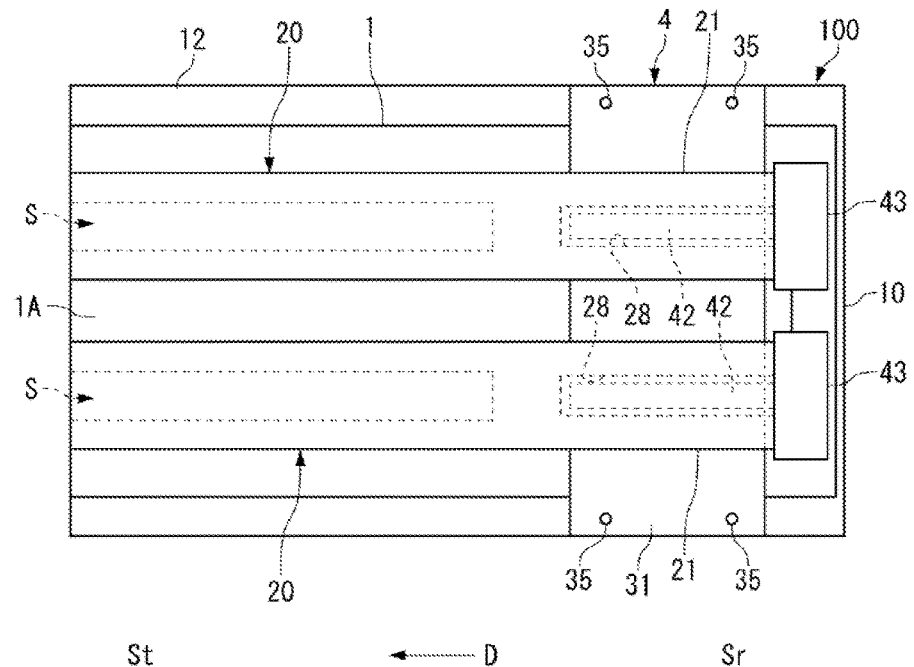

As shown in FIG. 9B, in addition to the use of the above-described positioning plate 4, it is also possible to form a block 43 in the skin 1 or the mold 10, which positions the end part 21 of the mandrel 20 in the longitudinal direction D. The block 43 may be formed in any shape, and the block 43 may be formed with a recessed part for receiving the end part 21.

Butting the end part 21 against the block 43 determines the position of the mandrel 20 relative to the skin 1 or the mold 10, where the block 43 is formed, in the longitudinal direction D, so that the mandrel 20 can be positioned relative to the skin 1 in the longitudinal direction D.

The block 43 together with the positioning plate 4 constitutes the positioning part of the present invention.

While in the above embodiments, the stringer 2 is integrally molded on the skin 1, the stringer 2 which is separately molded from the skin 1 may be bonded to the skin 1. The present invention is also applicable to positioning of such stringer 2.

In this case, a region for positioning, similar to the bottom surface 201 of the end part 21 of the mandrel 20, may be provided at the end of the stringer 2. The recessed part 22 into which the protrusion 32 of the positioning plate 3 is inserted is formed in the region. Then, the positioning plate 3 is interposed between the positioning region and the skin 1 or the mold 10.

In addition, evacuation of the air is not essential for molding the skin 1 or the stringer 2. For example, the present invention also encompasses a method of molding the stringer 2 by placing a weight on the mandrel 20 without evacuation of the air.

Moreover, the present invention also encompasses the use of pre-preg as the FRP material of the skin 1 and the stringer 2.

The present invention can be widely used in the manufacture of FRP structures constituting various devices and structures in addition to the manufacture of FRP structures constituting an aircraft.

What is claimed is:

1. A fiber-reinforced plastic structure manufacturing device for manufacturing a fiber-reinforced plastic structure integrating a long member, which is a fiber-reinforced plastic member having a longer dimension in a longitudinal direction than in a direction intersecting the longitudinal direction, with a sheet member, which is a fiber-reinforced plastic member, the fiber-reinforced plastic structure manufacturing device comprising:
   a first mold for supporting the sheet member;
   a second mold for molding the long member; and
   a positioning part that engages with at least one of the sheet member and the first mold,
   wherein the positioning part further engages with an end of the second mold from a first mold side, wherein the positioning part positions the second mold relative to the sheet member, at least in the direction intersecting the longitudinal direction, wherein the positioning part is deformable in an out-of-plane direction along at least one of the first mold and the sheet member, and wherein the positioning part is a plate-shaped member interposed between the first mold and the second mold.

2. The fiber-reinforced plastic structure manufacturing device according to claim 1, wherein the positioning part is removably attached to the sheet member.

3. The fiber-reinforced plastic structure manufacturing device according to claim 1, wherein the positioning part is fixed to the first mold.

4. The fiber-reinforced plastic structure manufacturing device according to claim 3, wherein
   the positioning part is fixed with multiple pins to the first mold,
   at least one of the pins is fixed at a predetermined reference position, and
   the other pins are inserted into long holes formed in the first mold along the longitudinal direction.

5. The fiber-reinforced plastic structure manufacturing device according to claim 1, wherein the positioning part engages with a portion of the end of the second mold on the first mold side at two positions spaced apart from each other in the longitudinal direction.

6. The fiber-reinforced plastic structure manufacturing device according to claim 5, wherein
   the positioning part comprises: a plate; and multiple engaging members which are provided in the plate and engage with the end of the second mold, and
   the multiple engaging members are provided in the same plate at positions apart from each other in the longitudinal direction.

7. The fiber-reinforced plastic structure manufacturing device according to claim 1, wherein
   the second mold comprises a first block and a second block divided along the longitudinal direction,
   a recessed part located at the boundary between the first block and the second block is formed in a portion of an end of the second mold on the first mold side, and
   the positioning part comprises a protrusion which engages with the second mold by being inserted into the recessed part.

8. The fiber-reinforced plastic structure manufacturing device according to claim 7, wherein
the second mold has a shape with a substantially triangular transverse cross-section having slope surfaces on the first block and the second block, and
the second mold includes an angle material which is disposed on the slope surfaces of the first block and the second block.

9. The fiber-reinforced plastic structure manufacturing device according to claim 7, wherein
the protrusion is formed in a semispherical shape or a substantially semispherical shape, and
the recessed part is formed in a shape which conforms to the protrusion.

10. The fiber-reinforced plastic structure manufacturing device according to claim 1, wherein
the sheet member is a skin of an aircraft, and
the long member is a stringer of the aircraft.

11. A method for manufacturing the fiber-reinforced plastic structure with a fiber-reinforced plastic structure manufacturing device for manufacturing a fiber-reinforced plastic structure integrating a long member, which is a fiber-reinforced plastic member having a longer dimension in a longitudinal direction than in a direction intersecting the longitudinal direction, with a sheet member, which is a fiber-reinforced plastic member, the fiber-reinforced plastic structure manufacturing device comprising:
a first mold for supporting the sheet member;
a second mold for molding the long member; and
a positioning part that engages with at least one of the sheet member and the first mold,
wherein the positioning part further engages with an end of the second mold from a first mold side, wherein the positioning part positions the second mold relative to the sheet member, at least in the direction intersecting the longitudinal direction, wherein the positioning part is deformable in an out-of-plane direction along at least one of the first mold and the sheet member, and wherein the positioning part is a plate-shaped member interposed between the first mold and the second mold, the method including:
providing the first mold;
supporting the sheet member on the first mold;
providing the positioning part, which is either disposed along the first mold or on the sheet member;
placing fiber-reinforced plastic material into the second mold;
engaging the positioning part with an end of the second mold, from the first mold side, to position the long member relative to the sheet member; and
curing the long member.

12. A fiber-reinforced plastic structure manufacturing device for manufacturing a fiber-reinforced plastic structure integrating a long member, which is a fiber-reinforced plastic member having a longer dimension in a longitudinal direction than in a direction intersecting the longitudinal direction, with a sheet member, which is a fiber-reinforced plastic member, the fiber-reinforced plastic structure manufacturing device comprising:
a first mold for supporting the sheet member;
a second mold for molding the long member; and
a positioning part that engages with at least one of the sheet member and the first mold,
wherein the positioning part further engages with an end of the second mold from a first mold side, wherein the positioning part positions the second mold relative to the sheet member, at least in the direction intersecting the longitudinal direction, and
wherein the second mold comprises a first block and a second block divided along the longitudinal direction,
a recessed part located at the boundary between the first block and the second block is formed in a portion of an end of the second mold on the first mold side, and
the positioning part comprises a protrusion which engages with the second mold by being inserted into the recessed part.

13. The fiber-reinforced plastic structure manufacturing device according to claim 12, wherein,
the second mold has a shape with a substantially triangular transverse cross-section having slope surfaces on the first block and the second block, and
the second mold includes an angle material which is disposed on the slope surfaces of the first block and the second block.

14. The fiber-reinforced plastic structure manufacturing device according to claim 12, wherein,
the protrusion is formed in a semispherical shape or a substantially semispherical shape, and
the recessed part is formed in a shape which conforms to the protrusion.

* * * * *